March 5, 1963 J. E. McFARLAND 3,080,540

WAVE GUIDE ATTENUATOR USING SHAPED ABSORBER OF IRON POWDER LOADED RESIN TO EQUALIZE SHUNT AND SERIES LOSSES

Filed Oct. 5, 1960

INVENTOR.
JAMES E. McFARLAND
BY
James O. Eisenman
ATTORNEY

United States Patent Office 3,080,540

Patented Mar. 5, 1963

3,080,540

WAVE GUIDE ATTENUATOR USING SHAPED ABSORBER OF IRON POWDER LOADED RESIN TO EQUALIZE SHUNT AND SERIES LOSSES

James E. McFarland, Jamaica, N.Y., assignor to The Narda Microwave Corporation, Mineola, N.Y., a corporation of New York Filed Oct. 5, 1960, Ser. No. 60,690

9 Claims. (Cl. 333—81)

The present invention relates to microwave devices, and more particularly to wave guide attenuators of the dissipative type.

One prior art attenuator consists of a vane of dielectric that is coated with microwave resistance material and inserted into a rectangular wave guide. When the guide is excited in a dominant mode whose electric field vectors are parallel to the plane of the vane, currents flow in the resistance material. Energy is dissipated in the form of heat. If it is desired to vary the attenuation, the vane is displaced laterally across the guide or vertically in and out of a slot in a wide wall of the guide.

Generally, dissipative attenuators are frequency sensitive. For example, in a fixed wave guide attenuator known in the art for producing an attenuation of 20 db, there is a change in attenuation of ±1 db over a frequency range covering 40 percent of the calibration frequency of the attenuator. In a wave guide attenuator whose attenuation is adjustable from 0 to 20 db, for example, the attenuation changes by at least ±1.5 db, at any setting, if the frequency is varied over the above range. The change is even greater for attenuators that produce a larger attenuation than mentioned above.

It is an object of the present invention to provide a dissipative attenuator for wave guides whose attenuation is relatively insensitive to frequency variations over a wide frequency range.

It is further object to provide an improved fixed wave guide attenuator whose calibration is precise and extremely stable, whose VSWR is very low, and whose frequency sensitivity is minimized.

It is still another object to provide an improved adjustable wave guide attenuator having a very low VSWR and minimum frequency sensitivity.

It is yet another object to provide a dissipative attenuator for wave guides whose change in attenuation with frequency is limited to ±2% of the design value or setting of the attenuation or ±.2 db, whichever is higher, over a frequency range covering approximately 40 percent of the calibration frequency.

The foregoing and other objects and advantages of the invention, which will become more apparent from the detailed description below, are attained by an attenuator comprising a lossy element of a dielectric material such as an epoxy resin loaded with conductive particles such as iron. The element is supported centrally between the narrow walls of a rectangular wave guide to form a lossy ridge guide whose cut-off frequency is lower than that of a rectangular wave guide of the same dimensions. The attenuator element has both series and shunt losses, which are made equal to minimize the frequency sensitivity of the attenuator by properly choosing the thickness of the lossy element and the ratio of the weight of the conductive particles to the weight of the dielectric.

Referring now to the drawings.

Figure 1:
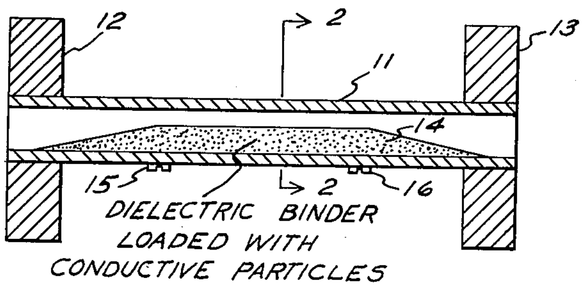
FIG. 1 is a longitudinal sectional view of a fixed lossy-ridge attenuator according to the present invention.
Figure 2:
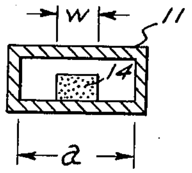
FIG. 2 is a cross sectional view taken along the line 2—2 of FIG. 1.

Referring to FIGS. 1 and 2, 11 is a hollow rectangular wave guide for propagating microwave energy in a dominant $TE_{10}$ mode over a given frequency range. The electric vectors of this mode extend perpendicularly between the broad walls of the guide, being of maximum intensity along the center of the guide.

Flanges 12 and 13 are provided at the ends of the guide for connecting it to input and output sections of wave guide, not shown. The length of guide 11 depends upon the attenuation to be produced which in turn depends upon the length of an element 14 of dissipative attenuating material supported longitudinally along the center of one of the broad walls of guide 11. Screws 15 and 16 hold the element 14 in place.

The attenuator element 14 is preferably formed of a low-loss dielectric binder such as an epoxy resin in which very small particles of conductive material such as iron are homogenously dispersed. The sizes of the particles are small compared to the skin depth of microwave currents carried by wave guide 11.

Element 14 has rectangular cross sectional dimensions and its ends are tapered for minimizing reflections of microwave energy. Since element 14 is partially conductive, wave guide 11 is a ridge wave guide. Thus, the guide 11 can be operated in a dominant mode over a wider frequency range than a ridge-less guide, and the attenuation produced by element 11 remains more nearly constant with frequency over a wider range.

In accordance with an important aspect of the present invention, the frequency sensitivity of the attenuator is minimized further by making the series and shunt losses of element 14 substantially equal. This is accomplished by a judicious choice of the thickness of element 14 and the ratio of the weight of the iron particles to the weight of the epoxy resin.

Generally, it has been found that to make the series and shunt losses of the attenuator equal at frequencies below approximately twelve kilomegacycles, the thickness "w" of element 14 should be about one-third the wide inner cross sectional dimension of the wave guide 11. At frequencies above twelve kilomegacycles, the thickness may be less, and is best determined empirically. The ratio of the weight of the iron particles to the weight of the epoxy resin is within the range of 3:1 to 10:1, depending upon the operating frequency. The best combination of thickness and ratio to achieve equal series and shunt losses must be obtained by trial and error.

In a rectangular wave guide for operation from seven to ten kilomegacycles, whose inner broad and narrow wall dimensions are equal to 1,122 inches and 0.497 inch respectively, an attenuator element whose width "w" is equal to 0.375 inch has been used. The attenuator element consists of an epoxy resin binder homogenously loaded with super fine iron particles whose diameter equals three microns. The ratio of the weight of the iron particles to the weight of the binder is 10:1, whereby the series and shunt losses of the attenuator are substantially equal and the attenuation is substantially constant with frequency over the entire frequency range.

The variation in attenuation with frequency of a 20 db fixed attenuator as described above is ±.2 db for a frequency variation of ±20% of the calibration frequency, which is one-tenth the variation in prior art wave guide dissipative attenuators. Furthermore, the VSWR of the attenuator is nearly equal to 1 over the entire frequency range.

The amount of attenuation provided is a function of the length and the height of the attenuator element 14.

For attenuators designed for producing an attenuation of less than 20 db, it has been found that the variation in attenuation is ±.2 db over a frequency band covering 40% of the calibration frequency. For attenuators designed for producing an attenuation of more than 20 db, the variation is ±2% of the attenuation at the calibration frequency.

Figure 3:
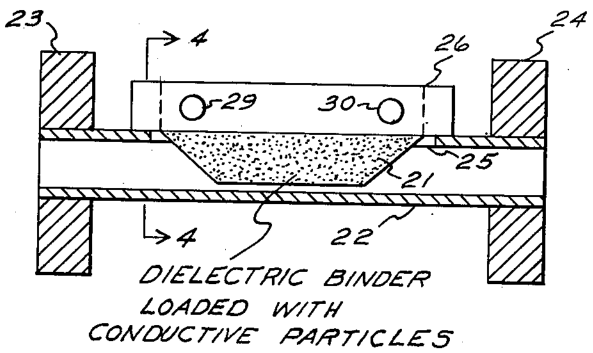
FIG. 3 is a longitudinal sectional view of an adjustable lossy-ridge attenuator according to another embodiment of the invention.
Figure 4:
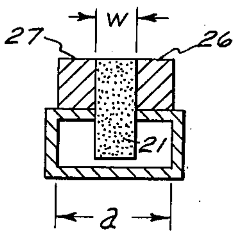
FIG. 4 is a cross sectional view taken along the line 4—4 of FIG. 3.

Referring now to FIGS. 3–4, a variable attenuator is shown having an attenuator element 21 supported within a hollow rectangular wave guide 22 for propagating microwave energy in a dominant $TE_{10}$ mode. The ends of the guide 22 are terminated by flanges 23 and 24 for connecting the device to input and output sections of wave guide, not shown.

A longitudinal slot 25 is provided along the center of one of the broad walls of the wave guide 22 for permitting the attenuator element to be inserted into and out of the wave guide. The ends of slot 25 may be tapered for minimizing reflections in accordance with principles known in the art.

A pair of metallic flanges 26 and 27 are supported along opposite sides of slot 25 for supporting the attenuator element 21. Adjustable knobs 29 and 30 are provided along flange 26 for operating a suitable mechanism, not shown, for adjusting the attenuator element 21 so that it can be moved up and down between flanges 26, 27 and within the interior of wave guide 22 in a direction vertical to the broad walls of the wave guide.

The attenuator element 21 is made of an epoxy resin loaded with iron particles for making its series and shunt losses substantially equal as has been described with respect to the attenuator of FIG. 1. The width "$w$" of element 21 is approximately one-third the wide inner dimension "$a$" of the wave guide 22. The ends of element 21 are tapered as shown in FIG. 3 to minimize reflections.

With the wave guide 22 excited in the $TE_{10}$ mode and element 21 inserted all the way into the guide, maximum attenuation is produced. This attenuation is a function of the length of element 21 along the axis of the wave guide 22. As the depth of penetration of element 21 into the wave guide is reduced, the attenuation decreases.

Zero attenuation is produced when the bottom edge of element 21 is above the inner surface of the upper wide wall of the guide. In this position, element 21 has substantially no effect on the microwave currents in the $TE_{10}$ mode for reasons well known in the art.

In the variable attenuator shown in FIGS. 3 and 4 the wave guide 22 effectively is a lossy ridge wave guide whose cut-off frequency is lowered for most positions of element 21. As has been described with respect to the fixed attenuator of FIGS. 1 and 2, this increases the operating band width over which a constant attenuation is provided.

Figure 5:
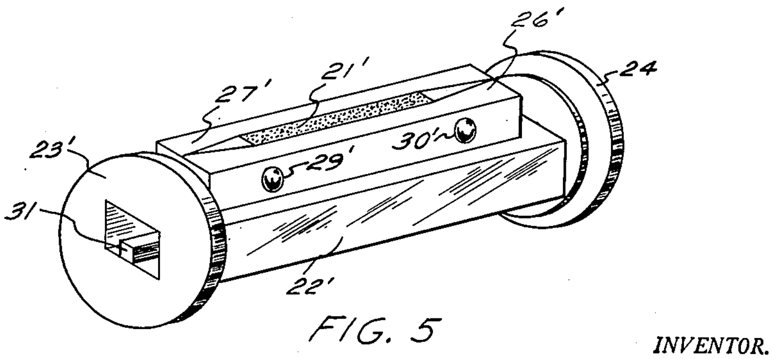
FIG. 5 is a perspective view of still another embodiment of an adjustable lossy ridge attenuator.

In FIG. 5, a variable attenuator similar to that shown in FIGS. 3–4, except for a ridge 31 along the lower wide wall of the wave guide, is illustrated. Similar parts have been given primed reference numerals. The ridge 31 is of highly conductive metal, extends longitudinally from one end to the other of wave guide 22' opposite the attenuator element 21', and has rectangular cross sectional dimensions.

In the device of FIG. 5, the wave guide 22' operates as a ridge wave guide regardless of the position of attenuator element 21'. Thus, the cut-off frequency of the guide is lowered and its operating frequency range in the dominant mode is increased regardless of the attenuator setting.

Variable attenuators have been designed as described above where the attenuation for any setting between 0 and 60 db is substantially constant over a frequency range of 4 to 8 kilomegacycles. The variation in attenuation, for any setting, is only ±2% of the setting of attenuation, or ±.2 db, whichever is higher. Furthermore, the VSWR of the attenuator is nearly equal to 1.

Since changes could be made both in the illustrated embodiments of the invention and the above description, and different words of description could be used without departing from the scope and spirt of the invention, it is to be understood that the invention is limited solely by the appended claims.

What is claimed is:

1. A lossy ridge attenuator comprising a section of rectangular wave guide having a pair of relatively narrow solid walls and a pair of relatively wide walls, a three-dimensional vane of attenuating material supported at the center of said wave guide with the plane of the vane being parallel to the narrow walls and perpendicular to the wide walls of said wave guide, said vane being comprised of a dielectric material that is loaded with conductive particles, the thickness of the vane and the ratio of the weight of the conductive particles to the weight of the dielectric material being predetermined for making the shunt and series microwave losses of said vane substantially equal.

2. The attenuator of claim 1 wherein the thickness of the vane is approximately one-third the width of the wide walls of said wave guide and the vane comprises a solid mass extending into the guide from one of said wide walls.

3. A lossy ridge attenuator comprising a section of rectangular wave guide having a pair of relatively narrow and a pair of relatively wide walls for carrying microwave energy, an elongated three-dimensional vane of attenuating material whose thickness is approximately one-third the wide cross-sectional dimension of said wave guide, and means for supporting said vane at the center of said wave guide section with the plane containing the elongated axis of the vane being substantially perpendicular to the wide walls of said wave guide, said vane being of attenuating material comprising an epoxy resin that is loaded with iron particles the sizes of said particles being small relative to the skin depth of microwave currents carried by said wave guide, the ratio of the weight of the iron particles to the weight of the resin being in a range from 3:1 to 10:1, whereby the series and shunt losses of said vane are approximately equal.

4. The attenuator of claim 3 wherein said vane is supported entirely within the interior of said wave guide and is affixed to one of the wide walls thereof.

5. The attenuator of claim 3 wherein said vane is adjustably supported within a longitudinal slot provided along the center of one of the wide walls of said wave guide for movement into and out of the interior of said wave guide.

6. The attenuator of claim 5, further including a conductive ridge disposed along the other wide wall of said guide opposite said longitudinal slot.

7. A lossy ridge attenuator comprising a section of rectangular wave guide having a pair of relatively narrow and a pair of relatively wide walls for carrying microwave energy, a narrow slot extending longitudinally along the center of one of the wide walls of said wave guide, the ends of said slot being tapered, a three-dimensional vane of attenuating material whose thickness is approximately one-third the wide cross-sectional dimension of said wave guide, and means for supporting said vane for adjustment into and out of the interior of said wave guide through said slot, said vane being of an attenuating material comprising an epoxy resin that is loaded with iron particles, the sizes of said particles being small relative to the skin depth of microwave currents carried by said wave guide, the ratio of the weights of the iron particles to the weight of the resin being in a range from 3:1 to 10:1, whereby the series and shunt losses produced by said attenuator are approximately equal.

8. An attenuator element for dissipating microwave energy within a rectangular wave guide having a pair of relatively narrow and a pair of relatively wide walls, said element having rectangular cross sectional dimensions and a thickness that is approximately one-third the wide wall dimension of said wave guide, said element comprising an epoxy resin that is loaded with iron particles, the ratio of the weight of the particles to the weight of the epoxy resin being in the range from 3:1 to 10:1 for making the series and shunt losses of said element substantially equal for dominant mode energy carried by said wave guide.

9. A lossy ridge attenuator comprising a section of hollow wave guide of rectangular cross section having a pair of relatively narrow solid walls and a pair of relatively wide walls, and a ridge-like element for dissipating microwave energy within said guide, said ridge-like element being in the form of a three-dimensional vane lying in the plane of the electric vectors of the dominant mode of microwave energy carried by said guide, the thickness of said vane being approximately one-third the wide cross sectional dimension of said guide, said vane being comprised of an epoxy resin that is loaded with iron particles.

References Cited in the file of this patent

UNITED STATES PATENTS

| | | |
|---|---|---|
| 2,423,396 | Linder | July 1, 1947 |
| 2,430,130 | Linder | Nov. 4, 1947 |
| 2,505,557 | Lyman | Apr. 25, 1950 |
| 2,600,466 | Bowen | June 17, 1952 |
| 2,629,079 | Miller et al. | Feb. 17, 1953 |
| 2,646,551 | Roberts | July 21, 1953 |
| 2,837,720 | Saltzman | June 3, 1958 |
| 2,981,907 | Bundy | Apr. 25, 1961 |